(12) United States Patent
Baumgartner et al.

(10) Patent No.: US 9,847,517 B2
(45) Date of Patent: Dec. 19, 2017

(54) BATTERY PACK FOR A HAND-HELD POWER TOOL

(71) Applicant: Robert Bosch GmbH, Stuttgart (DE)

(72) Inventors: Josef Baumgartner, Wildberg (DE); Florian Schmehl, Ostfildern (DE)

(73) Assignee: ROBERT BOSCH GMBH, Stuttgart (DE)

(*) Notice: Subject to any disclaimer, the term of this patent is extended or adjusted under 35 U.S.C. 154(b) by 187 days.

(21) Appl. No.: 14/843,199

(22) Filed: Sep. 2, 2015

(65) Prior Publication Data

US 2016/0072106 A1 Mar. 10, 2016

(30) Foreign Application Priority Data

Sep. 9, 2014 (DE) .................. 10 2014 217 987

(51) Int. Cl.
*H01M 2/10* (2006.01)
*H02J 7/00* (2006.01)
*H01M 10/46* (2006.01)

(52) U.S. Cl.
CPC ........... *H01M 2/1022* (2013.01); *H01M 2/10* (2013.01); *H01M 10/46* (2013.01); *H02J 7/0052* (2013.01); *H01M 2220/30* (2013.01)

(58) Field of Classification Search
CPC ...... H01M 2/1022; H01M 2/10; H01M 10/46; H01M 2220/30; H02J 7/0052
See application file for complete search history.

(56) References Cited

U.S. PATENT DOCUMENTS

| | | | | |
|---|---|---|---|---|
| 5,410,237 | A * | 4/1995 | Sharrah | H01M 2/1022 320/110 |
| 6,524,732 | B1 * | 2/2003 | Iwaizono | H01M 10/42 429/100 |
| 8,248,029 | B2 * | 8/2012 | Hrabal | H02J 7/0003 320/110 |
| 9,280,654 | B1 * | 3/2016 | Peterson | G06F 21/44 |
| 2001/0001766 | A1 * | 5/2001 | Humphreys | H02J 7/0009 455/573 |
| 2010/0253279 | A1 * | 10/2010 | Matthias | B25F 5/00 320/106 |
| 2015/0303417 | A1 * | 10/2015 | Koeder | H01M 2/022 429/164 |

FOREIGN PATENT DOCUMENTS

| | | |
|---|---|---|
| EP | 1030385 A1 | 8/2000 |
| EP | 2511971 A1 | 10/2012 |
| WO | 2007115846 A1 | 10/2007 |

* cited by examiner

*Primary Examiner* — Naum B Levin
(74) *Attorney, Agent, or Firm* — Norton Rose Fulbright US LLP; Gerard Messina

(57) ABSTRACT

A battery pack for a hand-held power tool includes at least one interface for establishing a mechanical and/or electrical connection of the battery pack to a hand-held power tool and/or a charging device, the interface having a guide arrangement for attaching the battery pack on the hand-held power tool and/or the charging device along a contacting direction y, and at least four contact elements for electrical contacting of corresponding counter-contact elements on the hand-held power tool and/or corresponding counter-contact elements on the charging device. At least two contact elements are thereby situated offset from one another in the direction of the contacting direction y.

11 Claims, 5 Drawing Sheets

BATTERY PACK FOR A HAND-HELD POWER TOOL

RELATED APPLICATION INFORMATION

The present application claims priority to and the benefit of German patent application no. 10 2014 217 987.4, which was filed in Germany on Sep. 9, 2014, the disclosure of which is incorporated herein by reference.

FIELD OF THE INVENTION

The present invention relates to a battery pack for a hand-held power tool. The present invention relates principally to a battery pack for a battery-powered hand-held power tool including contact elements which may be contacted with counter-contact elements of the hand-held power tool for operating the hand-held power tool in an operating position of the battery pack on the hand-held power tool, and may be contacted with counter-contact elements on a battery charger for charging the battery pack in a charging position of the battery pack which has been disengaged from its operating position on the hand-held power tool.

BACKGROUND INFORMATION

Since battery-powered hand-held power tools enable a high flexibility during operation, as they are in particular independent from mains power and thus outdoor jobs may also be comfortably carried out, it is conventional to utilize battery packs during operation of a hand-held power tool.

Battery packs of this type are basically known and have rechargeable batteries, generally a plurality of battery cells connected in parallel and/or in series. In relation to this application, a battery pack is thus understood as a battery packet, which is composed of multiple electrically interconnected battery cells and may store electrical energy, deliver the energy necessary for operating the hand-held power tool, and may be mounted interchangeably on a hand-held power tool.

In general, a temperature signal and coding resistance values are transmitted, in addition to the voltage, during contacting of the battery pack with the hand-held power tool via contact elements consolidated in an interface.

An interface should be understood in particular as a device which is provided to directly or indirectly establish an electrical and, in particular, a mechanical connection to a charging device and/or a hand-held power tool.

The temperature signal is used for monitoring the battery pack cell temperature during the charging and discharging process. With the aid of the coding, the battery pack may be identified with respect to the charging device and the discharge side, i.e., the hand-held power tool, since the battery packs are usually configured specifically for a certain hand-held power tool. Other battery packs, which are not provided for the hand-held power tool, e.g., those with a different nominal voltage, may not be accepted on the part of the hand-held power tool so that the battery pack and/or the hand-held power tool are not damaged.

Coupling the battery pack to the hand-held power tool takes place by plugging or inserting the interface of the battery pack into a complementary plug-in socket of the device housing. The interface has contact slits in which contact elements may be situated. If the energy of the battery pack is consumed, then it may be removed and connected to a charging station having corresponding counter-contact elements. If multiple battery packs are available, it is thus possible to remove the discharged battery pack from the hand-held power tool and exchange it for a charged one.

The battery packs and also the hand-held power tools and charging devices, and thus the respective interfaces, are subject to constant further development, during which it is common that additional contact elements and counter-contact elements are to be implemented in the interfaces in order to exchange additional information between the devices. It is thus desirable, for reasons of manageability and handling of the battery pack and also the hand-held power tool, to keep the installation space necessary for the interface as compact as possible. In addition, for reasons of the compatibility with previous models, the demand arises, if necessary, that the geometry of the interface is to be changed as little as possible with respect to a previous model.

SUMMARY OF THE INVENTION

It is an object of the present invention to improve the disadvantages listed above and to provide a battery pack for a hand-held power tool, whose interface geometry is configured in such a way that a plurality of contact elements may be accommodated at a compact size of the interface, and which is thereby compatible with old interfaces in particular at an increased number of contact elements.

This object is achieved by a battery pack as described herein. Advantageous embodiments, variants, and refinements of the present invention may be derived from the further descriptions herein.

A battery pack according to the present invention for a hand-held power tool includes at least one interface for establishing a mechanical and electrical connection of the battery pack to a hand-held power tool and/or a charging device, the interface having a guide arrangement for positioning the battery pack along a contacting direction y on the hand-held power tool and/or the charging device, and at least four contact elements for electrical contacting of corresponding counter-contact elements on the hand-held power tool and/or corresponding counter-contact elements on the charging device. At least two contact elements are thereby situated offset from one another in the direction of contacting direction y. In this way, a battery pack may be provided with a compact interface geometry in which a plurality of contact elements is accommodated and which guarantees the compatibility between the interfaces of old battery packs or the interface of new battery packs with the hand-held power tool and/or the charging device.

In one specific embodiment, the at least two contact elements situated offset from one another are situated offset from one another in pairs so that for each pair of contact elements situated offset from one another a first contact element is present, placed further forward in contacting direction y, and a second contact element is present, placed further back in contacting direction y.

In one particularly advantageous embodiment, the at least one first contact element of the at least one pair has a recess, through which recess the at least one second contact element is contactable by a counter-contact element of the hand-held power tool and/or a counter-contact element on the charging device.

The at least one first contact element and the at least one second contact element may each have a contact gap for contacting a counter-contact element, whereby a plane a, which is spanned by the contact gap of the first contact element and contacting direction y, also runs through the contact gap of the second contact element. It is particularly advantageous in this case that a projection of the contact gap of the at least one second contact element lies in contacting direction y in the area of the recess of the at least one first contact element.

The at least one first contact element may lie in a first contacting plane b and the at least one second contact element in a second contacting plane c.

In one particular refinement, the contact elements situated offset from one another in pairs include the first coding contact element and the second coding contact element.

In one specific embodiment, the interface of the battery pack includes five contact elements, a positive contact element, a negative contact element, a temperature contact element, and a first contact element being situated on a first contacting plane b, c, and a second contact element being situated on a second contacting plane c, b. A further contact element may be provided situated on a second contacting plane c, b. In this way, a plurality of contact elements may be accommodated in the interface of the battery pack, the offset arrangement enabling a compact configuration of the interface. In principle, it is particularly advantageous if at least one of the contact elements is a data contact element.

The present invention guarantees that a coding for the hand-held power tool is transmitted, when a battery pack according to the present invention is inserted into a hand-held power tool, by the corresponding shape and arrangement of the contact elements, whereas the counter-contact elements of the hand-held power tool cannot contact the contact element which is situated in the interface of the battery pack for contacting the charging device. Moreover, already existing battery packs may be charged by new charging devices, since the new charging devices are able, due to the arrangement of the counter-contact elements, to identify the coding for the already existing battery packs by contacting the contact elements of the battery pack.

The battery pack according to the present invention may be provided in a hand-held power tool. Accordingly, a hand-held power tool, which includes at least one battery pack according to the present invention and an interface with counter-contact elements for electrical and/or mechanical contacting of the contact elements of the battery pack, also forms a further subject matter of the present invention. For this purpose, at least two counter-contact elements of the hand-held power tool have different lengths L and/or heights H in such a way that they are suited for contacting at least one of the two contact elements of the battery pack situated offset from one another in the direction of contacting direction y. During mounting of the battery pack on a hand-held power tool, an accommodating arrangement, e.g., guide grooves and guide ribs, for accommodating the corresponding guide elements of the battery pack of the hand-held power tool, are engaged with the same, the battery pack being guided in a contacting direction y along the accommodating arrangement of the handle, and the battery pack being pushed into the battery pack receptacle of a hand-held power tool along a lower outer surface of the handle oriented essentially perpendicularly to the longitudinal direction of the handle.

The battery pack according to the present invention may also be used together with a charging device. Accordingly, a charging device for charging a battery pack according to the present invention also forms a further subject matter of the present invention. For this purpose, the charging device has an interface with counter-contact elements for electrical and/or mechanical contacting of the contact elements of the battery pack, at least two counter-contact elements having different lengths L and/or heights H in such a way that they are suited for contacting at least one of the two contact elements of the battery pack situated offset from one another in the direction of contacting direction y.

In general, a hand-held power tool is understood to mean all hand-held power tools including a head which is able to be set in rotation or translation, and which is directly drivable by a drive motor via a gearing or a planetary gear, for example cordless screwdrivers, rechargeable drills, percussion drills, multi tools, saws, grinders, shears, and/or cordless combi drills. Transmission of electrical energy is to be understood in this context to mean that the hand-held power tool transmits energy to the body via a battery pack.

Additional features, potential applications, advantages, and embodiments of the present invention arise from the subsequent description of the exemplary embodiments of the present invention which are represented in the figures. The description, the associated figures, and the further descriptions herein contain numerous features in combination. Those skilled in the art will also consider these features, in particular the features of different exemplary embodiments, individually and also combine them into meaningful additional combinations. One should take into consideration that the features shown have only a descriptive character and may also be used in combination with features of other further developments described above and are not conceived of as limiting the present invention in any way.

The present invention is subsequently explained in greater detail based on the exemplary embodiments. The drawings are schematic.

DETAILED DESCRIPTION

Figure 1:
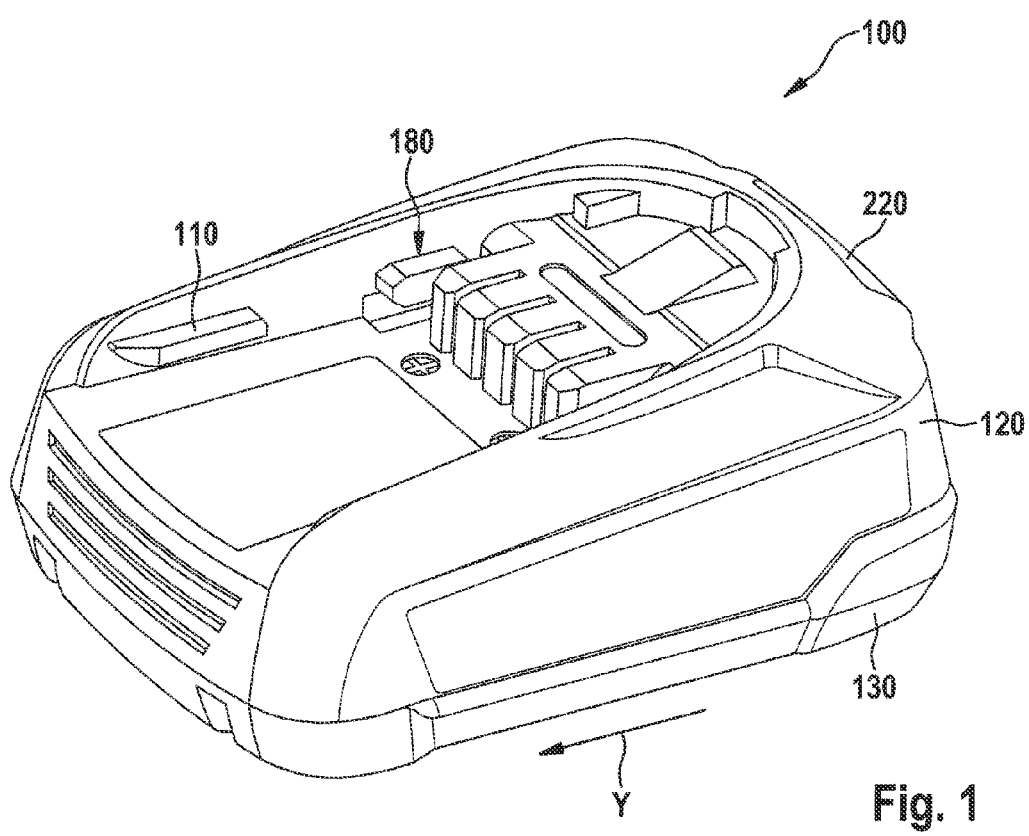
FIG. 1 shows a perspective view of a battery pack according to the present invention.

FIG. 1 shows a battery pack 100. Battery pack 100 includes a housing made of a first housing component 120 and a second housing component 130, the housing accommodating between first housing component 120 and second housing component 130 a plurality of battery cells 400 connected in parallel or in series. Battery cells 400 are positioned between the two housing components 120, 130 either with the aid of a cell support 410, as shown, or with the aid of cardboard sleeves to insulate battery cells 400 from one another. Battery pack 100 is configured in the embodiment variant shown as a slide-in battery pack. Upon mounting battery pack 100 on a hand-held power tool 300 or on a charging station 700, accommodating arrangement 310, 710, e.g., guide grooves and guide ribs, of hand-held power tool 300 or of charging device 700 engage with corresponding guide elements 110 of battery pack 100 for accommodating the same, battery pack 100 being inserted in a contacting direction y along accommodating arrangement 310, 710, and an interface 180 of battery pack 100 being slid into a corresponding interface 380 of hand-held power tool 300 or a corresponding interface 780 of charging device 700.

Battery pack 100 may be assigned to hand-held power tool 300 and/or of charging device 700 via interfaces 180, 380, 780.

Figure 2:
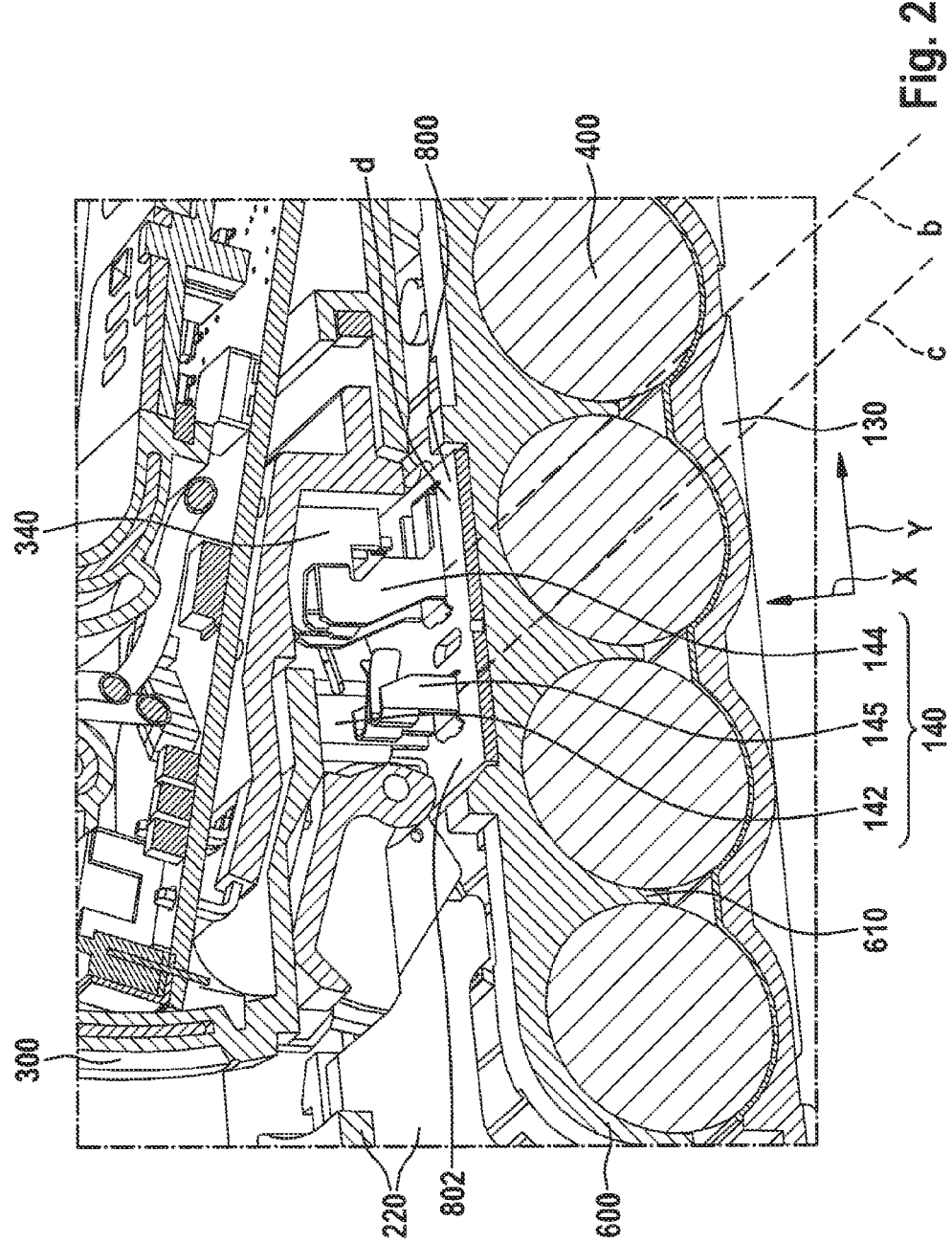
FIG. 2 shows a sectional view of the battery pack from FIG. 1 during coupling with a hand-held power tool.

As is apparent in FIG. 2, the battery pack housing accommodates between first housing component 120 and second housing component 130 a cell support 500 having a plurality of battery cells 400 connected in series. It is also apparent that individual battery cells 400 are accommodated at a distance from one another in a cell bracket 600 for mechanical fixing. Cell bracket 600 is used, in addition to fixing battery cells 400 in battery pack housing 120, 130, to cool battery cells 400 as well, and is composed of a heat-conductive material, for example, aluminum, or a plastic. Furthermore, cell bracket 600 has ribs 610 so that individual battery cells 400 are separated and an electrical insulation of individual battery cells 400 from one another may be guaranteed. The heat transfer resistance between adjacent battery cells 400 as well as between battery cells 400 and cell bracket 600 may be low so that heat losses generated by battery cells 400 may be easily dissipated to the outside and an overheating of the battery pack in the interior may be prevented. A battery pack electronics 800 is fixed within battery pack housing 120, 130 on the surface of cell bracket 600. Contact elements 140 are fixed on battery pack electronics 800 for establishing the electrical and mechanical connection between battery pack 100 and hand-held power tool 300 or between battery pack 100 and charging device 700. The connection between battery pack electronics 800 and cell bracket 600 is guaranteed by fixing elements.

Figure 3:
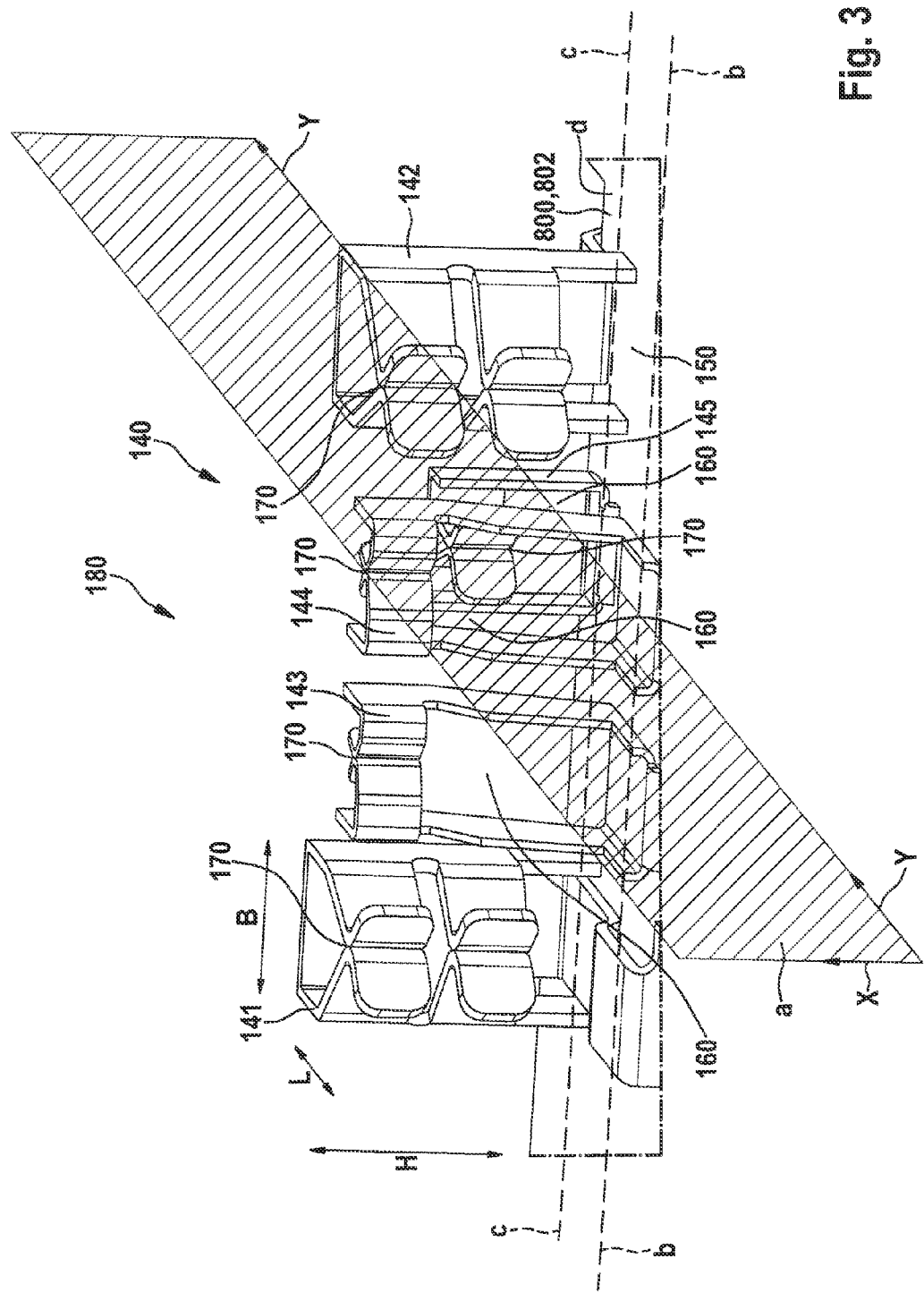
FIG. 3 shows a perspective detail view of contact elements of the interface of the battery pack from FIGS. 1 and 2.

In addition, it is apparent in detail in FIG. 3 that interface 180 of battery pack 100 includes five contact elements 140, the five contact elements 140 being fixed on battery pack electronics 800, two contact elements, a positive contact element 141 and a negative contact element 142 being provided for the power supply, and further contact elements 143, 144, 145 being coding contact elements and temperature contact elements.

Two contact elements 144, 145 situated offset from one another are offset from one another in pairs in such a way that a first contact element 144 is present placed further forward in contacting direction y and a second contact element 145 is present placed further back in contacting direction y. In the specific embodiment shown, first contact element 144 and second contact element 145 of the pair have a recess 160. Second contact element 145 is contactable through recess 160 of front first contact element 144 by a counter-contact element 340 on hand-held power tool 300 and/or by a counter-contact 740 on charging device 700.

Figure 4:
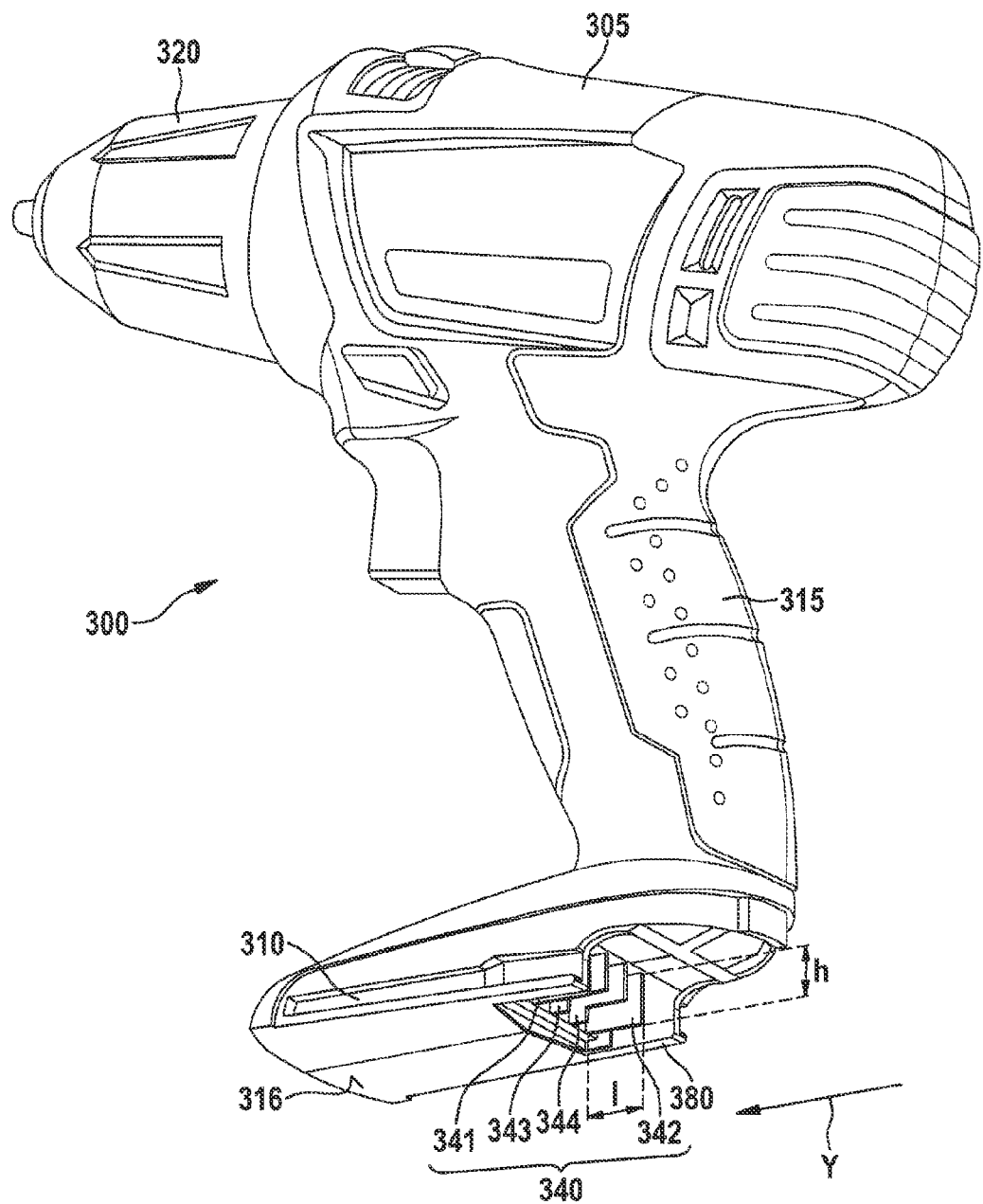
FIG. 4 shows a perspective view of a hand-held power tool according to the present invention without a battery pack.
Figure 5:
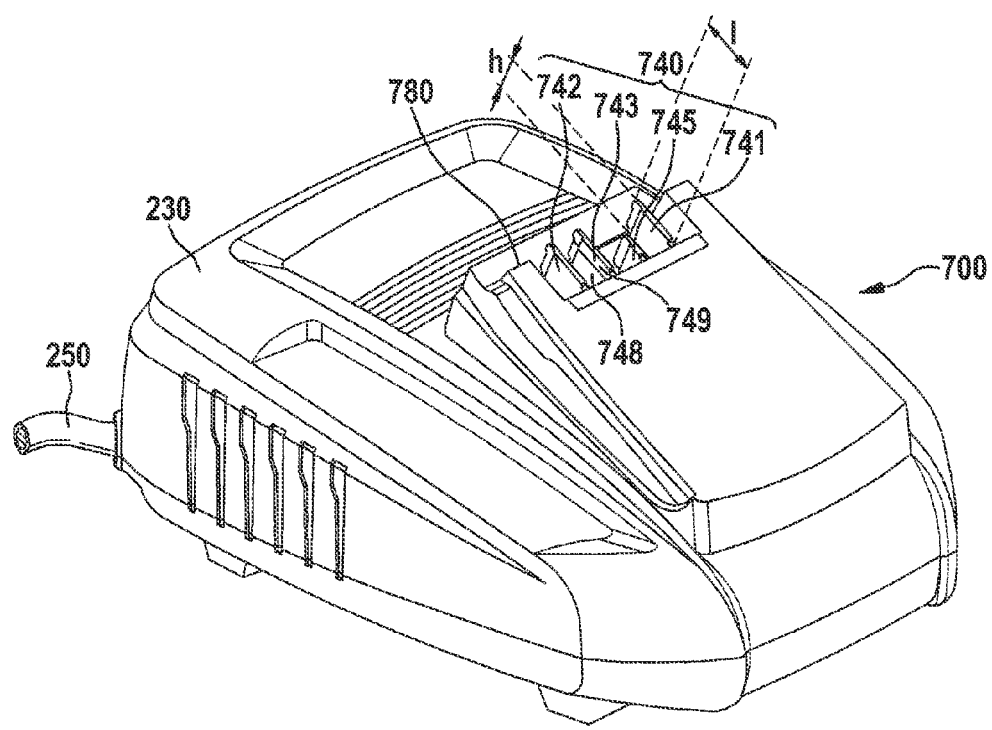
FIG. 5 shows a perspective view of a charging device according to the present invention.

As shown in FIGS. 4 and 5, contact elements 140 interact during mounting of battery pack 100 on a hand-held power tool 300 or on a charging device 700 with corresponding counter-contact elements 740, 340, so that, in principle, battery pack 100 is mountable or usable on hand-held power tool 300 or charging device 700 only in the presence of contact elements 140 and counter-contact elements 340, 740 corresponding to one another.

Moreover, in the variant of interface 180 shown in FIG. 3, positive contact element 141, negative contact element 142, temperature contact element 143, and first coding contact element 144 are situated on a first contacting plane b, and a second coding contact element 145 is situated on a second contacting plane c. The arrangement of an additional contact element in second contacting plane c is also possible in principle. The two contacting planes b, c are situated in parallel to one another yet offset from one another in contacting direction y. In this way, interface 180 of battery pack 100 may accommodate a plurality of contact elements 140 in an unchanged interface geometry, and thereby satisfy the demand for a space-saving compact configuration.

Contact elements 140 shown in FIGS. 2 and 3 are configured as contact tulips and have in each case a contact gap 170 for contacting counter-contact elements 340, 740. A plane a is spanned in this case by contact gap 170 of first contact element 144 and contacting direction y, which also runs through contact gap 170 of second contact element 145. A projection of contact gap 170 of the at least one second contact element 145 lies along contacting direction y on the at least one first contact element 144 in the area of recess 160 of the at least one first contact element 144. Moreover, contact elements 140 are configured in such a way that they have a length L, height H, and width B, whereby it is apparent in FIG. 3 that the contact elements 140 shown differ in particular in their respective height H and length L. Accordingly, counter-contact elements 340, 740, as is apparent in FIGS. 4 and 5, are configured in such a way that they are clampable in contact gap 170 of the respectively complementary contact element 140 of battery pack 100.

All contact elements 143, 144, 145, which are situated between the two power supply contact elements 141, 142, have a shorter length L than the two power supply contact elements 141, 142. Moreover, they have different heights H and in each case a recess 160 below contact gap 170. A configuration of this type of contact elements 143, 144, 145 makes is possible that two contact elements, for example coding contacts 144, 145, may be situated one behind the other in plane a and offset from one another in contacting direction y so that the space required for two contact elements 144, 145 with respect to width B and length L is equal to that required for adjacent power supply contact element 142. Due to different heights H and also due to respective recesses 160 of contact elements 143, 144, 145, situated offset or one behind the other, it may be guaranteed that a counter-contact element 340 on hand-held power tool 300 and/or a counter-contact element 740 on charging device 700 contacts second contact element 145, which is placed further back on second contacting plane c, through recess 160 of first contact element 144, which is placed further forward on first contact plane b, without contacting first contact element 144 which is placed further forward. Likewise, in this way first contact element 144, which is placed further forward, may be contacted without establishing a contact with second contact element 145 which is placed further back. In this way, it is possible that correspondingly configured counter-contact elements 340 of hand-held power tool 300 contact first contact element 144 placed further forward and/or second contact element 145 placed further back, whereas a correspondingly configured counter-contact element 745 of charging device 700 only contacts first contact element 144.

Due to a suitable layout of contact elements 140 of interface 180 of battery pack 100 according to the present invention, this battery pack is not only compatible with charging device 700 and/or hand-held power tool 300, which have a newly adapted interface 780, 380, but also with charging devices 700 and/or hand-held power tools 300 which only have an interface 780, 380 for a maximum of four contact elements 140, which are, nevertheless, situated adjacent to one another in contacting direction y. In this way, there may be, according to the geometric configuration of contact elements 140, a multiplicity of contact elements 140 instead of four contact elements 140, for example, additional coding contact elements or data contact elements accommodated in interface 180 of battery pack 100 according to the present invention.

FIG. 4 shows an electrical device configured as hand-held power tool 300. According to the specific embodiment shown, hand-held power tool 300 is mechanically and electrically connectable to battery pack 100 shown in FIG. 1 for off-grid power supply. Hand-held power tool 300 is configured for example as a cordless drill. However, reference is made to the fact that the present invention is not limited to cordless drills, but instead may be used in different hand-held power tools (300) which are operated by a battery pack 100. Hand-held power tool 300 has a base body 305, on which a tool holder 320 is fixed, and a handle 315, on which battery pack 100 according to the present invention may be situated in a locked manner. To lock battery pack 100 on handle 315, battery pack 100 is inserted in contacting direction y along handle 315, namely along a lower outer surface 316 of handle 315 oriented essentially perpendicularly to the longitudinal direction of handle 315. The locking arrangement includes, among other things, locking elements not shown in detail and an actuating element 220. By actuating actuating element 220, battery pack 100 may be disengaged from handle 315 of hand-held power tool 300. After unlocking battery pack 100, it may be separated from handle 315, namely by pushing battery pack 100 along a lower surface 316 of handle 315 counter to contacting direction y.

Counter-contact elements 340 of hand-held power tool 300 corresponding to contact elements 140 of battery pack 100 have a negative counter-contact element 341 and a positive counter-contact element 342 for the power supply and two further counter-contact elements 343 and 344 for coding and temperature. All counter-contact elements 340 are configured in the form of a contact tongue so that these are clampable in contact gap 170 of the respectively complementary contact element 140 of battery pack 100. It is quite apparent in the embodiment variant shown in FIG. 4 that counter-contact elements 343, 344 placed between counter-contact elements 341, 342 indeed have the same length as the two counter-contact elements 341, 342; however they have a significantly lower height H, whereby the insertion resistance for a battery pack 100 to be inserted is significantly reduced, yet it is simultaneously guaranteed that these two counter-contact elements 343, 344 only contact contact elements 143, 144 of battery pack 100 situated higher in first contacting plane b, and do not contact contact elements 145 situated lower in second contacting plane c.

Charging device 700 shown in FIG. 5 may be connected to mains current using a cable 250 and is mechanically and electrically connectable via interface 780 to battery pack 100 shown in FIG. 1. Charging device 700 has a base body 230 on which battery pack 100 according to the present invention may be situated, battery pack 100 being pushed along housing 230 in a contacting direction y. After charging of battery pack 100 has been completed, it may be separated again from charging device 700, namely by pushing battery pack 100 counter to contacting direction y.

Like counter-contact elements 340 of hand-held power tool 300, counter-contact elements 740 of charging device 700 also have, corresponding to contact elements 140 of battery pack 100, a positive counter-contact element 741 and a negative counter-contact 742 for the power supply and two further counter-contact elements 743 and 745 for coding and temperature. All counter-contact elements 740 are configured in the form of a contact tongue, so that they are clampable in contact gap 170 of respectively complementary contact elements 140 of battery pack 100. As is apparent in the specific embodiment variant shown in FIG. 5, counter-contact element 743, situated between counter-contact elements 741, 742, has the same length L and also the same height H as the two counter-contact elements 741, 742. However, in this case, the lower subarea of counter-contact element 743 is configured from a non-conductive material so that contacting is not possible with a contact element configured to be lower and placed further back on second contact plane c. In contrast, contact may be established with contact element 145 by the upper subarea of counter-contact element 743.

An alternative specific embodiment for a configuration of a counter-contact element 740 has a counter-contact element 745 which is configured to be shorter in comparison to other counter-contact elements 740, yet has the same height H as other counter-contact elements 741, 742, 743. Thus, this counter-contact element 745 may also only contact a high contact element 143, 144 of battery pack 100 situated on first contacting plane b, and not a contact element 145 situated on second contacting plane c.

In principle, the configuration of counter-contact elements 340 of interface 380 of hand-held power tool 300 and the configuration of counter-contact elements 740 of interface 780 of charging device 700 may be adapted to the respective specific embodiment of associated battery pack 100; however, it is also possible, due to the arrangement according to the present invention of contact elements 140 on different planes b, c, that a battery pack 100 according to the present invention is compatible with a series of interfaces 380, 780 on hand-held power tools 300 and/or charging devices 700 already on the market.

In addition to the specific embodiments described and illustrated, further specific embodiments are conceivable, which may include further modifications and combinations of features.

What is claimed is:

1. A battery pack for a hand-held power tool, comprising:
   an interface for establishing a mechanical and electrical connection of the battery pack with at least one of a hand-held power tool and a charging device;
   wherein the interface includes a guide arrangement for attaching the battery pack to the at least one of the hand-held power tool and the charging device along a contacting direction, and at least four contact elements for the at least one of electrically contacting and mechanically contacting corresponding counter-contact elements on at least one of the hand-held power tool and corresponding counter-contact elements on the charging device,
   wherein the contact elements are situated adjacent to one another in the contacting direction,
   wherein the contact elements are configured as contact tulips each having a contact gap for contacting the counter-contact elements,
   wherein at least two of the contact elements have different heights and are situated offset from one another in the direction of the contacting direction, and
   wherein a first front contact element of the at least two contact elements has a recess below the contact gap, a second contact element of the at least two contact elements being contactable through the recess by a counter-contact element on the hand-held power tool and/or by a counter-contact element on the charging device.

2. The battery pack of claim 1, wherein the at least two contact elements situated offset from one another are situated offset from one another in pairs, so that for each pair of contact elements situated offset, a first contact element is present, placed further forward in the contacting direction, and a second contact element is present, placed further back in the contacting direction.

3. The battery pack of claim 2, wherein the at least one first contact element and the at least one second contact element each have a contact gap for contacting a counter-contact element, a plane, which is spanned by the contact gap of the first contact element and the contacting direction, also running through the contact gap of the second contact element.

4. The battery pack of claim 3, wherein a projection of the contact gap of the at least one second contact element along the contacting direction onto the at least one first contact element lies in the area of the recess of the at least one first contact element.

5. The battery pack of claim 2, wherein the at least one first contact element lies in a first contacting plane and the at least one second contact element lies in a second contacting plane.

6. The battery pack of claim 2, wherein the contact elements situated offset from one another in pairs include the first coding contact element and the second coding contact element.

7. The battery pack of claim 5, wherein the interface has five contact elements, a positive contact element, a negative contact element, a temperature contact element, and a first contact element being situated on one of the two contacting planes, and a second coding contact element being situated on the other contacting plane.

8. The battery pack of claim 5, wherein a further contact element is situated on the second contacting plane.

9. The battery pack of claim 1, wherein at least one of the contact elements is a data contact element.

10. A hand-held power tool, comprising:
a battery pack for a hand-held power tool, including:
an interface for establishing a mechanical and electrical connection of the battery pack with at least one of a hand-held power tool and a charging device,
wherein the interface includes a guide arrangement for attaching the battery pack to the at least one of the hand-held power tool and the charging device along a contacting direction, and at least four contact elements for the at least one of electrically contacting and mechanically contacting corresponding counter-contact elements on at least one of the hand-held power tool and corresponding counter-contact elements on the charging device, wherein the contact elements are situated adjacent to one another in the contacting direction, wherein the contact elements are configured as contact tulips each having a contact gap for contacting the counter-contact elements, and wherein at least two of the contact elements have different heights and are situated offset from one another in the direction of the contacting direction; and
a counter-contact interface including counter-contact elements for electrically contacting and/or mechanically contacting the contact elements of the battery pack, wherein at least two of the counter-contact elements have different lengths and/or heights so that they are suited for contacting at least one of the two contact elements situated offset from one another in the direction of the contacting direction,
wherein a first front contact element of the at least two contact elements has a recess below the contact gap, a second contact element of the at least two contact elements being contactable through the recess by a counter-contact element on the hand-held power tool and/or by a counter-contact element on the charging device.

11. A charging device for charging a battery pack, comprising:
a counter-contact interface including counter-contact elements for electrically contacting and/or mechanically contacting contact elements of the battery pack, wherein at least two of the counter-contact elements have different lengths and/or heights so that they are suited for contacting at least one of the two contact elements situated offset from one another in the direction of the contacting direction;
wherein the battery pack includes an interface for establishing a mechanical and electrical connection of the battery pack with at least one of a hand-held power tool and a charging device,
wherein the interface includes a guide arrangement for attaching the battery pack to the at least one of the hand-held power tool and the charging device along a contacting direction, and at least four contact elements for the at least one of electrically contacting and mechanically contacting corresponding ones of the counter-contact elements on at least one of the hand-held power tool and corresponding counter-contact elements on the charging device, wherein the contact elements are situated adjacent to one another in the contacting direction, wherein the contact elements are configured as contact tulips each having a contact gap for contacting the counter-contact elements, and wherein at least two of the contact elements have different heights and are situated offset from one another in the direction of the contacting direction,
wherein a first front contact element of the at least two contact elements has a recess below the contact gap, a second contact element of the at least two contact elements being contactable through the recess by a counter-contact element on the hand-held power tool and/or by a counter-contact element on the charging device.

* * * * *